United States Patent [19]

Lumbeck et al.

[11] 4,274,883

[45] Jun. 23, 1981

[54] AQUEOUS DISPERSION OF A HYDROPHOBIC SILICA

[75] Inventors: Gerd Lumbeck, Hanau; Horst Ferch, Bruchkobel, both of Fed. Rep. of Germany

[73] Assignee: Deutsche Gold- und Silber Scheideanstalt vormals Roessler, Frankfurt, Fed. Rep. of Germany

[21] Appl. No.: 76,723

[22] Filed: Sep. 18, 1979

[30] Foreign Application Priority Data

Oct. 10, 1978 [DE] Fed. Rep. of Germany ....... 2844052

[51] Int. Cl.$^3$ ................................................. C09C 3/12
[52] U.S. Cl. .......................... 106/308 Q; 260/29.7 R; 260/42.15
[58] Field of Search ............ 260/42.15, 42.37, 29.7 R, 260/42.55; 106/308 Q

[56] References Cited

U.S. PATENT DOCUMENTS

| | | | |
|---|---|---|---|
| 3,098,837 | 7/1963 | Haxo | 260/42.55 |
| 3,649,320 | 3/1972 | Yates | 260/42.15 |
| 3,673,133 | 6/1972 | Schmidt | 260/42.37 |
| 3,700,690 | 10/1972 | Burke | 260/42.55 |
| 3,758,432 | 9/1973 | Hopper | 260/42.55 |
| 3,873,489 | 3/1975 | Thurn | 260/42.15 |
| 4,063,958 | 12/1977 | Roth | 106/308 Q |
| 4,068,024 | 1/1978 | Laufer | 106/308 Q |
| 4,072,796 | 2/1978 | Reinhardt | 260/42.15 |

*Primary Examiner*—Paul R. Michl
*Attorney, Agent, or Firm*—Cushman, Darby & Cushman

[57] ABSTRACT

An aqueous dispersion of a hydrophobic silica consisting of 0.1 to 50 parts of hydrophobic silica, in a given case up to 3 parts of wetting agent and 99.9 to 50 parts of water. It is produced by intensive mixing of hydrophobic silica with water with the known "dry-water-phase" as an intermediate step. In a given case there can additionally be used a wetting agent in which case the "dry-water-phase" does not occur. The dispersion of hydrophobic silicas can be mixed without additional steps or materials with rubber latex.

8 Claims, No Drawings

AQUEOUS DISPERSION OF A HYDROPHOBIC SILICA

BACKGROUND OF THE INVENTION

The invention is directed to an aqueous dispersion of a hydrophobic silica as well as to the process for its production.

For example from the Brunner German AS No. 1163784 there is known a hydrophobic silica and inter alia it is employed as an agent for increasing the pourability of fire-extinguishing powders. The entire disclosure of Brown is hereby incorporated by reference and relied upon.

For the use as filler in rubber it is desirable with special operating processes, as, e.g. in the production of rubber gloves to mix an aqueous latex emulsion with an aqueous dispersion of a hydrophobic silica.

Of course it is known to produce aqueous dispersions of pyrogenically produced hydrophilic silicas by dispersing this silica in pure water with addition of an alkaline acting material as, e.g., alkali hydroxide or waterglass solution (see Shutte German Pat. No. 16674601). However, the hydrophilic, pyrogenically produced silicas show completely different properties as fillers than the hydrophobic silicas.

From Brunner German Pat. No. 1467023 and related Schutte U.S. Pat. No. 3,393,155, it is furthermore known to mechanically mix in the ratio of 5:1 to 10:1 water with progenically produced silicon dioxide (silica) that has been modified with halosilane so that it contains a powdery, uniform system (so-called "dry-water phase"). In this process there is not attained the formation of a dispersion. (There is hereby incorporated by reference and relied upon the entire disclosure of Schutte U.S. Pat. No. 3,393,155.)

The problem of the present invention is the production of an aqueous dispersion of a hydrophobic silica.

SUMMARY OF THE INVENTION

According to the invention there is produced an aqueous dispersion of a hydrophobic silica consisting essentially of 0.1 to 50 parts of hydrophobic silica, in a given case up to 3 parts of a wetting agent, e.g. 0.1 to 3 parts of a wetting agent, and 99.9 to 50 parts of water.

There can be used any wetting agent which will clearly reduce the surface tension in the system water/hydrophobic silica. For example anionic, cationic and non-ionic wetting agents can be used.

In a preferred form of the invention the aqueous dispersion consists of 10 to 15 parts of water. There can optionally be present the indicated amount of wetting agent.

As hydrophobic silicas the dispersion can contain a silica which is hydrophobized for example according to Brown U.S. Pat. No. 3,334,062, Brunner German AS No. 1163784, Brown German AS No. 1158196 or Rauner U.S. Pat. No. 3,333,776. The entire disclosures of the Brown U.S. patent, Rauner U.S. patent and Brown German AS are hereby incorporated by reference and relied upon. In connection with the hydrophobization of the silica there can be employed silicas produced pyrogenically, by means of an electric arc or by precipitation.

As hydrophobizing agents there can be employed, for example, alkyl or aryl or mixed alkyl-aryl halosilanes, e.g., dimethyldichlorosilane, ethyltrichlorosilane, amyltrichlorosilane, vinyltrichlorosilane, phenyltrichlorosilane, methyltrichlorosilane, methylvinyl dichlorosilane, trimethylchlorosilane, diphenyldichlorosilane, bis-trichlorosilyl-ethane, bis-trichlorosilylbenzene, the corresponding esters, e.g., ethyl triethoxysilane, amyltriethoxysilane, vinyltriethoxysilane, phenyltriethoxysilane, dimethyldiethoxysilane, diphenyldiethoxysilane, betacarbethoxyethyltriethoxysilane and beta-carbethoxypropylmethyldiethoxysilane, phenyldimethylethoxysilane, phenylmethyl dimethoxysilane; a cyclic siloxane of the formula $(R_2SiO)_3$ where R is monovalent hydrocarbon, monovalent beta-fluoralkylethyl or monovalent haloaryl radical, e.g. R can be methyl, ethyl, isopropyl, t-butyl, hexyl, octadecyl, vinyl, allyl, methallyl, hexenyl, butadienyl, cyclopentyl, cyclobutyl, cyclohexenyl, benzyl, betaphenylethyl, phenyl, zenyl, tolyl, naphthyl, anthraryl, 3,3,3-trifluoropropyl, perfluoroctyl ethyl, tetrachlorophenyl, pentabromoxenyl, the compounds including e.g. hexamethylcyclotrisiloxane, tris (3,3,3-trifluoropropyl)-trimethylcyclotrisiloxane, sym-triphenyl-trimethylcyclotrisiloxane, hexaphenylcyclotrisiloxanes, sym-trimethyltrivinylcyclotrisiloxane, sym-tris (cyclohexyl) triethylcyclotrisiloxane, sym-tris (dibromophenyl)-trimethylcyclotrisiloxane, 1,1-bis(beta-phenylpropyl) 2,3-diallyldimethylcyclotrisiloxane; an organo or haloorgano silazane, e.g. hexamethylcyclotrisilanzane, phenylmethyloctasilazane, 3,3,3-trifluoropropyldimethyldisilazane, hexamethyldisilazane, hexylpolysilazane.

Preferably there is contained in the dispersion a hydrophobic silica produced according to Brunner German AS 1163784 which hydrophobic silica is made by hydrophobizing pyrogenically produced silica with dimethyldichlorosilane (available commercially as aerosil No. R 972.

As previously indicated the aqueous dispersion can contain as a wetting agent cationic, anionic and non-ionic wetting agents. For example there can be used the sodium salt of a naphthalenesulfonic acid-formaldehyde condensation product, aliphatic amines, e.g. containing a long chain aliphatic group, e.g., hexadecyltrimethyl ammonium chloride or alkylphenolpolyglycol ethers as e.g., nonylphenolpolyglycol ethers or isooctylphenolpolyglycol ether (e.g., p-nonylphenol or p-isooctylphenolethylene oxide adducts having 10 to 20 ethylene oxide units per molecule).

A further object of the invention is the development of a process for the production of aqueous dispersion which are characterized by intensive mixing of the hydrophobic silica and water, in a given case with addition of a wetting agent. ,p If no wetting agent is added there is obtained as an intermediate state the dry-water phase as is described in Brunner German Pat. No. 1467023 and Schutte U.S. Pat. No. 3,393,155.

As mixing apparatus there can be used an Ultra-Turrax (which is a powerful stirring device). However, it is advantageous in the use of this mixing apparatus to add a wetting agent.

Futhermore, there can be used in addition to a Braun-cake mixer a container with an impeller stirrer. It is only important that the mixer in addition to the true dispersing also changes a substantial portion of the energy into conveying operations. Hydrophobic silica and water basically must be turbulent. Thus for example the Ultra-Turrax is a mixer with high dispersing intensity at the shearing ring, which, however, only slightly moves the entire mixture. In order that to the highest extent possible the entire volume is kept strongly in motion, the stirrer used must be as large as possible in relation to the area of the container. Other suitable commercial mixtures could be for example Lodige-Mischer with quickly rotating mixing implements. An Ultra-Turrax would then be used if the compositions contain a large amount of wetting agent and the hydrophobic solica is directly worked into the water/wetting agent mixture with "dry-water phase". However, since the hydrophobizing action of hydrophobic silica is lower with increasing amount of wetting agent in the corresponding dispersion it appears worthy of effort to employ the lowest possible amount of wetting agent.

The dispersions of the invention can be mixed with rubber latex or acrylic dispersions in the rubber industry.

Unless otherwise indicated all parts and percentages are by weight.

The compositions can comprise, consist essentially of or consist of the materials set forth.

The dispersions of the invention as well as the process for producing them will be further explained and described in connection with the following examples.

In the examples DIN is the abbreviation for German Industrial Standard.

DESCRIPTION OF THE PREFERRED EMBODIMENTS

EXAMPLE 1

There were used 20 grams of Aerosil R 972 (hydrophobic pyrogenically produced silica made according to Brunner German AS No. 1163784) employing dimethyldichlorosilane as the hydrophobizing agent and having the following physical-chemical propterties:

| | | |
|---|---|---|
| BET-surface area | m$^2$/g | 110 ± 20 |
| Average size of the primary particles | nm | 16 |
| Bulk density according to DIN 53 194 | g/l | about 50 |
| Loss on drying according to DIN 55921 (2 hours at 105°) | % | <0.5 |
| Loss on annealing according to DIN 55921 (2 hours at 1000° C.) | % | <2 |
| pH (in 4% aqueous dispersion) | | 3.6–4.3 |
| SiO$_2$* | % | >99.8 |
| Al$_2$O$_3$* | % | <0.05 |
| Fe$_2$O$_3$* | % | <0.01 |
| TiO$_2$* | % | <0.03 |
| HCl | % | <0.05 |

*based on the material annealed for 2 hours at 1000° C.

The 20 grams of Aerosil R 972 and 180 grams of water were put into a Braun cake mixer (quickly rotating set of knives) and mixed at the highest number of rotations. There was formed the so-called "dry-water" according to Brunner German Pat. No. 1467023 and Schutte U.S. Pat. No. 3,393,155 in which the finest droplets of water are enclosed within a layer of silica. At first the silica is present in large excess, then by the intensive mixing there is continuously working into the water droplets more silica until finally the system "upsets" and from the powdery condition there is formed a thin pasty condition. The 10% paste contains the hydrophobic silica in substantially stable form. Only after long storage there occurs a separation or desimentation whereby the hydrophobic silica remains wet. The paste contains no wetting agent or solvent and permits mixing with other fluids without difficulty, thus even with Latex Primal AC 490 of Rohm and Hass. (Acrypolymer-dispersion).

EXAMPLE 2

In this example there was used Aerosil R 972 (hydrophobic pyrogenically produced silica made according to Brunner German AS No. 1163784) employing dimethyldichlorosilane as the hydrophobizing agent and having the following physical-chemical properties:

| | | |
|---|---|---|
| BET-surface area | m$^2$/g | 110 ± 20 |
| Average size of the primary particles | nm | 16 |
| Bulk density according to DIN 53 194 | g/l | about 50 |
| Loss on drying according to DIN 55 921 (2 hours at 105° C.) | % | <0.5 |
| pH- (in 4% aqueous dispersion) | | 3.6–4.3 |
| Loss on annealing according to DIN 55 921 (2 hours at 1000° C.) | % | <2 |
| SiO$_2$* | % | >99.8 |
| Al$_2$O$_3$* | % | <0.05 |
| Fe$_2$O$_3$* | % | <0.01 |
| TiO$_2$* | % | <0.03 |
| HCl | % | <0.05 |

*based on the material annealed for 2 hours at 1000° C.

There were mixed 30 grams of Aeroril R 972 and 170 grams of water whereby there was obtained a silica concentration of 15%. The mixture was converted into the powdery "dry-water" and the wetting attained through intensive further mixing. After a long mixing time a homogeneous dispersion was obtained without any addition of a wetting agent and solvent.

EXAMPLE 3

There was used Aerosil R 972 with the same properties as in Example 2.

There were mixed 30 grams of Aerosil R 972 with 70 grams of water. For the wetting of the "dry-water" there were added 3% of wetting agent, specifically Arkopal N 130 (nonylphenol polygylkol-ether). The product mixture ranged from a stiff paste up to easy granulation. Only after grinding on a three roll mill there was formed a homogeneous, stiff pasty product mixture. the mixing of the 30% concentrate with water or latex was difficult. In so doing it must be intensively dispersed.

EXAMPLE 4

30 grams of Aerosil R 972 in 120 grams of water was converted into "dry-water" with the help of the Braun mixed. After that there was added 0.15 grams of a wetting agent, corresponding to about 0.1%. As wetting agent there used Arkopal N 130 (nonylphenol polyglycol ether). After a short mixing there was obtained a stiff pasty dispersion. The Aerosil R 972 concentration in the dispersion was about 20%.

EXAMPLE 5

There was produced a dispersion according to the procedure in Example 4. In place of Arkopal N 130, however, there was used as the wetting agent 0.5 gram of Duomeen TDO paste (aliphatic amine). The amount of Duomeen corresponded to about 0.3%. The dispersion obtained was a stiff paste.

EXAMPLE 6

There was produced a dispersion according to the procedure of Example 4 but using as the wetting agent 0.5 gram of Tamol NNO (sodium salt of a naphthalenesulfonic acid-formaldehyde condensation product. The dispersion obtained was a stiff paste.

EXAMPLE 7

There was produced a dispersion according to the procedure of Example 4 but using 3 grams of Tamol NNO (sodium salt of a naphthalenesulfonic acid-formaldehyde condensation product), corresponding to about 2%. The dispersion obtained was thinly liquid.

EXAMPLE 8

There were mixed 30 grams of Aerosil R 972 with 70 grams of water. For the wetting of the "dry-water" there were added 3 grams of Tamol NNO (Sodium salt of a naphthalenesulfonic acid-formaldehyde condensation product. The dispersion obtained was a stiff paste.

EXAMPLE 9

60 grams of Aerosil R 972 were mixed with 540 grams of water. A propeller stirrer was used for the mixing (at 5000 rpm, radium of the propeller disc 29 mm). After the stirrer was turned on there was first formed a mixture similar to "dry-water". Upon further mixing the powdery condition converted into a thin pasty state. Finally the mixture was further mixed with a Dissolver (diameter of the Dissolver disc 50 mm, at 5000 rpm). After about 1 minute mixing time the mixture was thinly liquid. There were added in portions a further 30 grams of Aerosil R 972 during which in each case dispersion was carried out for about 1 minute with the Dissolver. The dispersion was still liquid and contained about 14.3% of Aerosil R 972, however, it did not contain any wetting or dispersing agent.

EXAMPLE 10

Silica D 17 is a precipitated silica which has been hydrophobized with a mixture of methyltrichlorosilane and dimethyldichlorosilane in aqueous suspension. This silica has the following physical-chemical properties.

| | | |
|---|---|---|
| Surface area according to BET | $m^2/g$ | 110 |
| Average size of the primary particles | nm | 28 |
| Bulk density according to DIN 53 194 | g/l | 80 |
| Loss on drying according to DIN 55 921 (2 hours at 105° C.) | % | <3 |
| Loss on annealing according to DIN 55 921 based on the material dried for 2 hours at 105° C. (2 hours at 1000° C.) | % | <7 |
| pH (in 5% aqueous dispersion) | | 7 |
| $SiO_2$* | % | >99.5 |
| $Al_2O_3$* | % | <0.2 |
| $Fe_2O_3$* | % | <0.03 |
| CaO* | % | — |
| $Na_2O$* | % | <0.2 |
| Cl* | % | <0.05 |
| $SO_3$* | % | <0.1 |
| Sieve residue (according to Mocker) | % | <0.1 |

*based on the material annealed for 2 hours at 1000° C.

30 grams of silica D 17 and 170 grams of water were mixed with the help of the Braun cake mixer. After passing through the "dry-water phase" the dispersion was pasty.

EXAMPLE 11

30 grams of material D 10 and 170 grams of water were mixed in the manner described in Example 10. There was added to the powdery mixture 1 gram of Triton X200 (pisooctylphenol polyethyleneglycolether). The dispersion obtained was a stiff paste.

The material D 10 is a precipitated silica hydrophobized with silicone oil which has the following physical chemical properties.

| | | |
|---|---|---|
| BET-surface area | $m^2/g$ | 90 |
| Average primary particle size | nm | 18 |
| Bulk density | g/l | 100 |
| Loss on drying | % | 3 |
| Loss on annealing | % | 7 |
| pH | | 8.5 |
| $SiO_2$* | % | 98 |

*based on the material annealed for 2 hours at 1000° C.

The following conclusions are drawn from the experiments (a) There can be used any wetting agent so long as the surface tension in the system water/hydrophobic silica is clearly (b) The viscosity of the mixture prepared is influenced by the wetting agent used. In using particularly suited wetting agents such s Tamol NNO the mixture obtained even at about 20% Aerosil R 972 is still thinly liquid. Aqueous Aerosil R 972 dispersion without addition of wetting agent can be obtained via the "dry-water phase".

The entire disclosure of German priority application P 2844052.0 is hereby incorporated by reference.

What is claimed:

1. An aqueous dispersion consisting essentially of 0.1 to 50 parts of hydrophobic silica, 0 to 3 parts of wetting agent and 99.9 to 50 parts of water, the hydrophobic silica being either a pyrogenic silica hydrophobized with a silane or a precipitated silica hydrophobized with a silane.

2. A dispersion according to claim 1 free of wetting agent.

3. A dispersion according to claim 1 containing wetting agent.

4. A dispersion according to claim 1 containing 10 to 15 parts of hydrophobic silica and 90 to 85 parts of water.

5. A dispersion according to claim 4 free of wetting agent.

6. A dispersion according to claim 4 containing wetting agent.

7. A dispersion according to claim 1 wherein the hydrophobic silica is a pyrogenic silica hydrophobized with a silane.

8. A dispersion according to claim 1 wherein the hydrophobic silica is a precipitated silica hydrophobized with a silane.

* * * * *